United States Patent [19] [11] 4,229,078
Bly et al. [45] Oct. 21, 1980

[54] HYDRO-OPTICAL MODULATOR FOR MODULATING TRANSMISSION OF RADIATION

[75] Inventors: Vincent T. Bly, Alexandria; Anthony T. Depersia, Woodbridge, both of Va.

[73] Assignee: The United States of America as represented by the Secretary of the Army, Washington, D.C.

[21] Appl. No.: 974,157

[22] Filed: Dec. 28, 1978

[51] Int. Cl.³ ............................................. G02F 1/11
[52] U.S. Cl. ................................. 350/353; 331/94.5 M
[58] Field of Search ............... 350/358, 359, 363, 266, 350/267, 312; 331/94.5 M

[56] References Cited

U.S. PATENT DOCUMENTS

| 3,371,978 | 3/1968 | Matovich | 350/312 |
| 3,706,149 | 12/1972 | Olivieri | 350/312 |

Primary Examiner—William L. Sikes
Attorney, Agent, or Firm—Nathan Edelberg; Robert P. Gibson; Max L. Harwell

[57] ABSTRACT

The hydro-optical modulator has a purged and hermetically sealed thin liquid cell with a working liquid throughout an enclosed sealed container that is in working contact with a pressure modulating system. The thin liquid cell is preferably a thin circular cell having windows on each side thereof where the optical radiation being modulated easily passes through the windows but is transmitted according to the size of bubbles in the working fluid. The size of the bubbles, and therefore the amount of optical radiation transmitted, is controlled by the pressure modulating system whereby smaller bubbles allow transmission while large bubbles scatter and limit transmission of optical radiation in an AC sensitive viewing device.

19 Claims, 4 Drawing Figures

HYDRO-OPTICAL MODULATOR FOR MODULATING TRANSMISSION OF RADIATION

The invention described herein may be manufactured, used and licensed by the U.S. Government for governmental purposes without the payment of any royalties thereon.

BACKGROUND OF THE INVENTION

There is a need for devices to modulate optical radiation, and especially radiation in the infrared spectral region. The present device is comprised of a unique combination of properties suiting it to important AC sensitive viewing devices and for night vision applications. Examples of night vision devices that the present hydro-optical modulator may be used with are the solid state pyroelectric retina, the thermo-optical imager, or any AC coupled, non scanning imager.

SUMMARY OF THE INVENTION

The present hydro-optical modulator has the features of being a compact configuration, operating over a broad spectral region, having a high "open" transmission, and having a modest power requirement. The modulator operates by scattering the optical radiation passing through transparent windows on each side of a thin liquid cell by means of varying the size of gas bubbles suspended in a working fluid in the thin liquid cell. The size of the bubbles, which directly determines the portion of the optical radiation that is scattered, is controlled by a pressure modulating system. By using a properly configured liquid cell and working fluid inside the liquid cell, the size of the bubbles during the high pressure portion of the pressure modulating system cycle will be sufficiently small that most of the optical radiation can pass through the modulator undisturbed, while during the low pressure portion when the bubbles become larger virtually all of the optical radiation is scattered instead of transmitted through the modulator.

The configuration of the thin liquid cell is preferably thin and circular with a very small separation between input and output windows, which may be flat parallel windows or objective lens elements, that are transparent to the radiation being modulated, with a pressure modulating system in operable contact with the working fluid within the cell. Various working fluids may be used. The working fluid used and the window or lens materials need to be matched to the spectral region of radiation being modulated.

There are three key features that are essential for the hydro-optical modulator to perform its best. These features include a working fluid having a relatively low surface tension so that small bubbles may exist throughout the working fluid, some pressure modulating system which causes turbulent flow to form the small bubbles, and a working fluid with a low viscosity so that the power required for the pressure modulating system is minimal.

DETAILED DESCRIPTION OF THE PREFERRED EMBODIMENT

Figure 1:
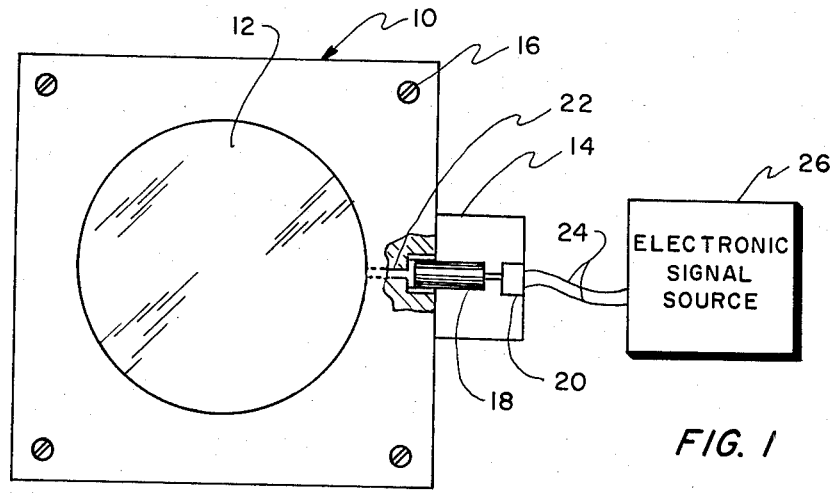
FIG. 1. shows a schematic of one embodiment of the present invention.
Figure 3:
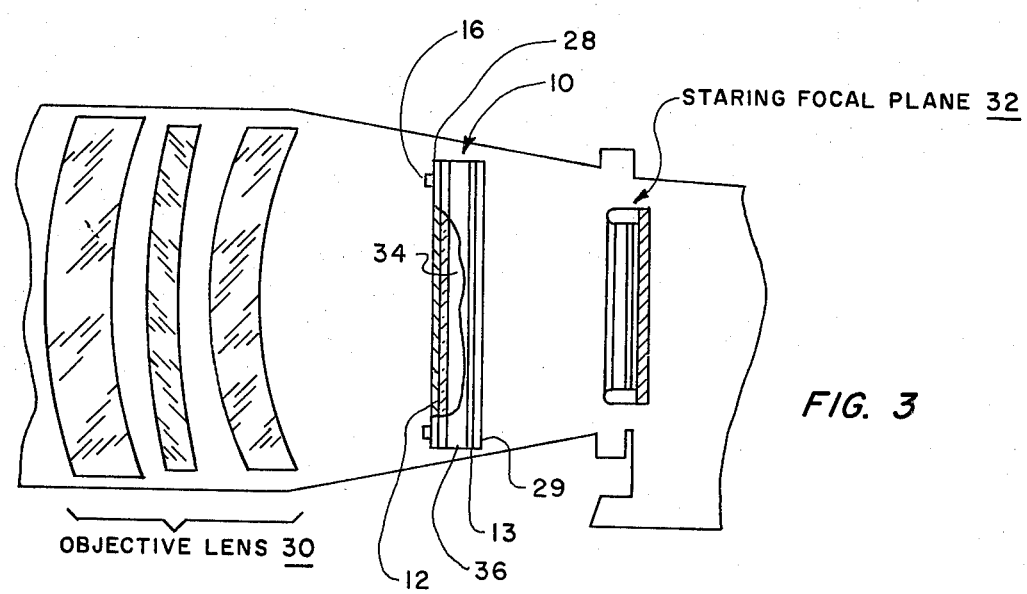
FIG. 3 illustrates a typical viewing system within which the present invention may be used.

FIGS. 1 and 3 illustrates schematically one embodiment of the present hydro-optical modulator 10, with the modulator 10 in a typical environment in which it may be used as shown by FIG. 3. The environment of FIG. 3 is depicted as an AC imager. The modulator is comprised of a modulator housing having a thin liquid cell 34 that is enclosed by oppositely facing front and back transparent windows 12 and 13, that may be flat windows or objective lens elements, held gainst a central portion 36 by front and back plates 28 and 29 by some fastening means 16, such as screws or bolts. A passage 22 exists between the face of a piston 18 and the liquid cell 34. The combined enclosed volume that includes cell 34 and passage 22 to the face of piston 18 will herein be called the sealed container and is the volume where the working fluid is enclosed. The sealed container is sealed air tight after being filled with the working fluid and being purged of any excess air entrapped therein. Any convenient air tight sealable exit (not shown) from the sealed container to the outside air may be used.

Numeral 14 indicates a modulator mechanism, or pressure modulating system, wherein an electronic signal source 26, such as an integrated circuit oscillator and an operational amplifier drive a solenoid 20 by AC signals over electrical leads 24. The solenoid has a drive shaft that is rigidly attached to piston 18.

Figure 2A:
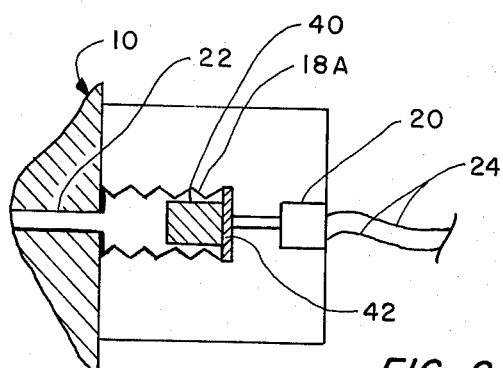
FIGS. 2A and 2B illustrate by partial excerpt view of FIG. 1 a second embodiment of the present invention.
Figure 2B:
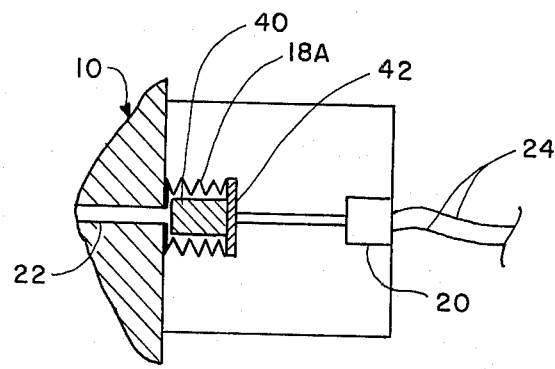

FIGS. 2A and 2B illustrate the preferred pressure modulating system of the present invention, i.e. a bellows 18A having a faceplate 42 with an internal piston 40 attached thereto connected by a shaft between the solenoid 20 and central portion 36. The piston 18 as shown in FIG. 1 however may be used instead. The advantage of the bellows system may be that in practice it is easier to seal air tight than the piston system.

The working fluids and windows or lenses used for the various spectral regions and the method of producing the bubbles will be explained in detail herein below. The container is first filled with the desired working fluid for the spectral range of the radiation to be modulated. Next, the container is purged so that ony the working fluid and its vapor remain, and is then sealed air tight. The sealed container volume is then expanded whereupon the bubbles will automatically be formed since the working fluid is essentially incompressible. By periodically modulating the volume of the sealed container, the bubbles will expand and contract. If the container is so structured that the periodic volume change within the sealed container creates turbelent flow, then the bubbles will shear against each other thus forming smaller and smaller bubbles, that will decrease in size to a critical limit as determined by the surface tension of the fluid vapor interface. A wetting agent, such as a photographic type wetting agent, can be added to the working fluid to reduce the surface tension. In this critical limit condition, in which the bubbles are from 10 $\mu$m to 100 $\mu$m in radius while in the compressed state, a small change in volume of the sealed container causes a large change in cross-sectional areas of the bubbles, thus resulting in high optical modulation. Note here why a small change in the volume causes a large change in the cross-sectional area. The reason is that the volume of each bubble is proportional to $r^3$ ($r$=radius of the bubble) and the cross-sectional area is proportional to $r^2$. Therefore, the ratio of change in cross-sectional area to change in volume is approximately 1/r. Thus, the smaller the radius, the larger the ratio.

The liquid cell 34 is preferably circular and of as small a volume as possible. Preferably the separation between front and back windows 12 and 13 is 0.5 to 5 millimeters. The diameter of the windows is not critical. Also, the thickness of the windows is less important since their transparency remain essentially the same. The liquid cell 34 is preferably circular so that the flow of the working fluid during agitation by the pressure modulating system is a spiral type flow around the circular volume. The volume change that is required by the pressure modulating system is in proportion of the volume of the working fluid. One pressure modulating system is by bellows 18A that are controlled by solenoid 20 having a shaft connected to the faceplate 42 wherein the other side of bellows 18A is connected to the central portion 36. In this embodiment, the working fluid completely fills the interior of the bellows after the step of purging and sealing the sealed container. FIG. 2A illustrates the bellows 18A in a retracted condition wherein the internal piston 40 is retracted into a low pressure and high volume condition for the sealed container. Note that only a part of the sealed container is shown, namely a portion of the passage 22 and the interior of the bellows 18A. FIG. 2B illustrates the bellows 18A when the internal piston 40 is in the compressed state, or the high pressure and low volume condition for the sealed container.

Another pressure modulating system is by a solid piston 18 that is solenoid driven back and forth the same as the bellows 18A wherein the piston 18 uses the central portion 36 as an air tight guide for the piston. Even though tests have been run with good results at 7 cycles per second, it is anticipated that up to about 50 cycles per second is possible and preferable for most applications. One or both of the windows 12 and 13 may be elements of the objective lens in a viewing system that may use the present type modulator.

The different type working fluids and window or lens materials for the various spectral regions are as follows. For the visible spectrum, the window or lens material is preferably clear glass and the working fluid may be purified water with a wetting agent such as, 10% to 20% ethyl alcohol, or 5% propyl alcohol, or glycerine, or some photographic type wetting agent. Also, in the visible spectral region, pure ethyl alcohol working fluid will work. For the 3-5 $\mu$m spectral region the working fluid may be alcohol free carbon tetrachloride. The alcohol would otherwise absorb in the 3 $\mu$m range. The window or lens material for the 3-5 $\mu$m spectral region may be one of the following materials: silicon, germanium, calcium fluoride, or other halide salts that are compatible with carbon tetrachloride. For the 8-11 $\mu$m spectral region the working fluid may be carbon disulfide. Due to a weak absorption band near 11.6 $\mu$m in normal carbon disulfide, a carbon disulfide using sulfur of atomic mass 36 may be desirable. This heavier isotope would shift the absorption band to approximately 13.0 $\mu$m, thereby extending the useful spectral region. The window or lens material for the 8-12 $\mu$m spectral region may be one of the following materials: barium fluoride, germanium, or polycrystalline zinc selenide. Anti-reflection coatings on the windows help increase the efficiency. Wetting agents may be added to the carbon tetrachloride or carbon disulfide to reduce the surface tension. Preferred wetting agents for the IR spectral region include Nujol or Fluorolube.

It should be noted that even though the pressure modulating system varies the pressure in an oscillating manner, the means pressure need not be at ambient atmospheric pressure. A mean pressure above or below ambient pressure may be desirable to extend the operating temperature range for a particular working fluid.

While two particular embodiments of the invention have been shown and discussed, it will be understood that the invention is not limited thereto, since many modifications may be made and will become apparent to those skilled in the art.

We claim:

1. A hydro-optical modulator for modulating the transmission of a broad spectral range of optical radiation therethrough in an AC sensitive viewing device, said hydro-optical modulator comprising:
    a modulator housing having a sealed container enclosed therein comprised of a thin liquid cell that is enclosed by oppositely facing front and back transparent windows wherein said thin liquid cell and said front and back transparent windows are aligned to receive incident radiation therethrough;
    a working fluid filling said sealed container; and
    a pressure modulating system in working contact with said working fluid in said sealed container wherein said sealed container is further comprised of a passage between said pressure modulating system and said thin liquid cell wherein said pressure modulating system produces bubbles within said working fluid by expansion of the volume of the working fluid filled sealed container and modulates the size of said bubbles to modulate the transmission of said incident radiation therethrough.

2. A hydro-optical modulator as set forth in claim 1 wherein said pressure modulating system is comprised of a bellows driven by an electronically controlled solenoid wherein said solenoid has a shaft connected to a faceplate side of said bellows with the other side of said bellows connected to said modulator housing wherein said faceplate side has an internal piston and the interior of said bellows is completely filled with said working fluid and forms a part of said sealed container whereby movement of the internal piston of said solenoid driven bellows causes expansion and contraction of the volume in said sealed container and the cross-sectional area of said bubbles.

3. A hydro-optical modulator as set forth in claim 1 wherein said pressure modulating system is comprised of a piston driven by an electronically controlled solenoid wherein said solenoid has a shaft connected to said piston wherein said piston operates within said modulator housing with the face of said piston in working contact with said working fluid in said sealed container.

4. A hydro-optical modulator as set forth in claim 2 wherein said front and back transparent windows are flat parallel clear glass having separation of from 0.5 millimeter to 5 millimeter forming said thin liquid cell that is filled with said working fluid and wherein said working fluid is matched to visible radiation in the visible spectral range.

5. A hydro-optical modulator as set forth in claim 4 wherein said working fluid is purified water and a wetting agent.

6. A hydro-optical modulator as set forth in claim 4 wherein said working fliud is pure ethyl alcohol.

7. A hydro-optical modulator as set forth in claim 5 wherein said wetting agent is ethyl alcohol of 10% to 20% solution.

8. A hydro-optical modulator as set forth in claim 5 wherein said wetting agent is glycerine.

9. A hydro-optical modulator as set forth in claim 5 wherein said wetting agent is a photographic type wetting agent.

10. A hydro-optical modulator as set forth in claim 5 wherein said wetting agent is propyl alcohol of 5% solution.

11. A hydro-optical modulator as set forth in claim 2 wherein said front and back transparent windows are flat parallel material that are transparent in the 3 μm to 5 μm spectral range and have a separation between said front and back transparent windows of from 0.5 millimeter to 5 millimeters forming said thin liquid cell that is filled with said working fluid and wherein said working fluid is alcohol free carbon tetrachloride.

12. A hydro-optical modulator as set forth in claim 11 wherein said flat parallel front and back transparent windows are made of halide salts that are compatible with alcohol free carbon tetrachloride.

13. A hydro-optical modulator as set forth in claim 12 wherein said halide salts are calcium fluoride.

14. A hydro-optical modulator as set forth in claim 11 wherein said flat parallel front and back transparent windows are made of silicon.

15. A hydro-optical modulator as set forth in claim 2 wherein said front and back transparent windows are flat parallel materials that are transparent in the 8 μm to 11.5 μm spectral region and have a separation between said front and back transparent windows of from 0.5 millimeter to 5 millimeter forming said thin liquid cell that is filled with said working fluid and wherein said working fluid is carbon disulfide using atomic mass 36 sulfur.

16. A hydro-optical modulator as set forth in claim 15 wherein said flat parallel front and back transparent windows are made of barium fluoride.

17. A hydro-optical modulator as set forth in claim 15 wherein said flat parallel front and back transparent windows are made of polycrystalline zinc selenide.

18. A hydro-optical modulator as set forth in claim 15 wherein said flat parallel front and back transparent windows are made of germanium.

19. A hydro-optical modular as set forth in claim 1 wherein at least one of said front and back transparent windows is an objective lens element of an optical system.

* * * * *